United States Patent [19]

Wey et al.

[11] 4,444,461
[45] Apr. 24, 1984

[54] FIBER OPTIC CONNECTOR AND METHOD OF MANUFACTURE

[75] Inventors: Robert A. Wey, Plainville; Harold A. Roberts, North Attleboro, both of Mass.; Roger Dery, Greenville, R.I.

[73] Assignee: Augat Inc., Mansfield, Mass.

[21] Appl. No.: 327,096

[22] Filed: Dec. 3, 1981

[51] Int. Cl.³ .................................................. G02B 7/26
[52] U.S. Cl. ............................................................ 350/96.21
[58] Field of Search ................ 350/96.20, 96.21, 96.22

[56] References Cited

U.S. PATENT DOCUMENTS

| | | | |
|---|---|---|---|
| 3,904,269 | 9/1975 | Lebduska et al. | 350/96.22 |
| 4,140,366 | 2/1979 | Makuch et al. | 350/96.22 |
| 4,181,402 | 1/1980 | Borsuk et al. | 350/96.21 |
| 4,183,619 | 1/1980 | Makuch | 350/96.21 |
| 4,192,056 | 3/1980 | Logan et al. | 350/96.21 X |
| 4,240,695 | 12/1980 | Evans | 350/96.21 |
| 4,279,469 | 7/1981 | Forman | 350/96.22 |
| 4,406,515 | 9/1983 | Roberts | 350/96.21 |

FOREIGN PATENT DOCUMENTS 2059104  4/1981  United Kingdom ............ 350/96.21

Primary Examiner—John D. Lee
Assistant Examiner—Frank González
Attorney, Agent, or Firm—Weingarten, Schurgin, Gagnebin & Hayes

[57] ABSTRACT

An interconnect for ferruled optical fibers which assures that the ferrule tips will not touch when inserted into an interconnect housing provides for a small, repeatable, yet non-zero spacing between the ends of opposed ferrules through a manufacturing technique in which the interconnect housing is provided with inserts pressfit into the housing utilizing a tool that establishes a precise spacing for the distal ends of the inserts regardless of the lengths of the inserts, thereby to provide precisely spaced-apart recessed seats for the flanges of the ferrules. The use of inserts also permits the formation of a central cavity in which an alignment sleeve may be either loosely or tightly captured. In one embodiment, a carrier is provided for the alignment sleeve to insure retention of the alignment sleeve during manufacture or use. In other embodiments, recessed seat spacing is provided by a precise length part or parts. These embodiments include a single insert, two abutting inserts, or two inserts with a spacing member sandwiched therebetween, in which the spacing member may be the aforementioned alignment sleeve carrier.

25 Claims, 10 Drawing Figures

FIBER OPTIC CONNECTOR AND METHOD OF MANUFACTURE

FIELD OF INVENTION

This invention relates to fiber optic connectors and to their method of manufacture.

BACKGROUND OF THE INVENTION

Efficient coupling of light from one optical fiber to another requires a precise alignment of the cores of the two fibers. In most fiber optic connectors, each fiber is terminated with a cylindrical ferrule. With the core of the fiber centered on the axis of the ferrule, the alignment of two optical fibers is reduced to the alignment of the central axes of the two ferrules.

In order to establish this alignment, the ferrules are usually inserted in opposition in an alignment sleeve within an interconnect housing. Such an arrangement is illustrated in U.S. application Ser. No. 283,288, filed by Harold A. Roberts, on July 14, 1981, incorporated herein by reference and assigned to the assignee hereof. The spacing of the opposed ferrules in the interconnect housing is accomplished by the mating of ferrule flanges with seats machined into the interconnect housing. The travel of each ferrule within the interconnect housing is limited by the mating of the flange with the seat. The distance between opposed seats is such that, taking into account the length of the ferrule from its tip to its flange, a predetermined spacing is established between the inserted ferrules. The precision with which the two ferrules can be spaced-apart is therefore dependent upon the spacing between the opposed seats in the interconnect housing and the individual lengths of the ferrules themselves. In terms of manufacturing, the degree of precision attainable by the machining of seats into an interconnect housing is not always high enough to assure that the ferrule tips will not come into contact when inserted into the interconnect housing, nor is the accuracy always high enough to prevent poor optical coupling due to large tip-to-tip spacing.

It will be appreciated that physical contact of two ferrules within an interconnect housing is undesirable because of the possibility of damage to the fiber ends due to scratching or scoring from microparticles or contaminants trapped between the ferrules. On the other hand, the light loss across the fiber-to-fiber joint increases as the fibers are separated. The desired separation is therefore one which is as small as possible, yet non-zero, so as to eliminate any possibility of the ferrule tips touching when thrust into an interconnect housing. Typically the separation should be larger than a typical dust particle and should therefore be greater than 0.0001 inch.

Thus a consideration in the design of an interconnecting mechanism for joining two optical fibers terminated by a ferrule is the provision of a very small repeatable non-zero separation between the ferrule tips. The determination and maintenance of the separation is, however, not a trivial problem due to the machine fabrication of the parts involved.

Another problem in the manufacture of a suitable interconnect is the provision of an alignment sleeve within the interconnect housing. For some applications a floating or loosely carried sleeve, such as described in the abovementioned patent application, is desirable to permit looser tolerances for the connector housings. However, capturing an alignment sleeve within an interconnect housing is also a non-trivial manufacturing problem.

Moreover, as the size of alignment sleeves is reduced to accommodate ferrules having reduced diameter tips, the small sleeves have become very difficult to handle and can fall out of the interconnect housing. Thus, a still further problem with prior interconnects is the problem of providing a small alignment sleeve in the interconnect housing, in which the alignment sleeve does not fall out either during manufacture or use.

SUMMARY OF THE INVENTION

In order to prevent contact between opposed ferrules, in the subject invention, one or more inserts are pressfit into an interconnect housing to provide opposed recessed seats which are precisely spaced-apart. Because of the accuracy with which the seats may be formed by the inserts, a tip spacing of as little as one ten-thousandth of an inch and no more than one thousandth of an inch may be maintained. This prevents tip contact while at the same time assuring good optical coupling. The use of multiple inserts also provides for the capture of an alignment sleeve in the interconnect housing, either in a loose or tight fit. An alignment sleeve carrier may also be provided to prevent the alignment sleeve from falling out during manufacture or use.

In one embodiment, in order to provide for precise non-zero spacing between ferrule tips in which each ferrule is provided with a flange a predetermined distance from the ferrule tip, a manufacturing technique is utilized in which an interconnect housing is provided with two opposed centrally-bored inserts which are pressfit within the central bore of the interconnect housing such that the distal ends of the inserts serve as recessed seats that are precisely spaced-apart a distance greater than the sum of the tip-to-flange distances of the two ferrules. When the ferrules are inserted through respective inserts into an alignment sleeve, the flanges on the ferrules mate with corresponding seats to provide a repeatable non-zero spacing between opposed ferrule tips. Since the distal ends of the inserts may be positioned precisely with respect to one another with an interconnect housing with the aid of a positioning tool, the inserts provide a uniquely precise approach for the spacing of opposed ferruled optical fibers in an alignment sleeve and/or interconnect housing.

In one embodiment, the precise spacing of the inserts within an interconnect housing is determined by a positioning tool or rod having one end referenced to the distal end of one of the inserts. Initially, one insert is pressfit into one end of the housing. Thereafter, a positioning tool having a shoulder coacting with the distal end of the pressfit insert and a coaxially projecting rod is positioned in the interconnect housing. With the tool in place, the rod projects into the central bore or cavity of the interconnect housing. An opposed centrally-bored insert is forced into the housing towards the already mounted insert, with the rod projecting through the central bore of the insert. The opposed insert may be forced into the housing by a plunger or flat-tipped tool, with the penetration of the insert into the housing being stopped at the point at which the flat-tipped tool meets the end of the rod. Since the length of the rod projecting into the interconnect housing may be precisely controlled from a point corresponding to the distal end of the already mounted insert, the distal ends of the inserts may be precisely spaced-apart. The distal ends act as recessed seats for inserted ferrules, such that the inserted ferrules may be given a precise tip-to-tip spacing. It will be appreciated that the tip separation is established to within a tolerance determined by the tolerances of the ferrule lengths since the positions of the distal ends of the inserts are exceptionally accurately controlled.

Experience has shown that the establishment of a precise distance between the tip of a ferrule and its flange is relatively simple. If the ferrule is made over-length, a polishing fixture can be provided which is referenced on the flange and is utilized to polish the tip down until the proper distance is achieved. Alternatively, the ferrule can be a pressfit piece assembled into a connector body which carries the flange, and the pressfit piece can be pressed in until the proper distance from the flange is reached.

It has been found that the pressfit is sufficient to maintain the inserts at the proper spacing even when ferrules are forced into the inserts. However, adhesive may be used between the inserts and the housing to further prevent insert movement.

In summary, the opposed inserts provide recessed seats within an interconnect housing, the spacing of which can be controlled to a much smaller tolerance than that achievable by the machining of recessed seats into an interconnect housing.

While the interior channel of one of the inserts can itself serve as an alignment sleeve, in one series of embodiments, a separate alignment sleeve is captured within space provided between opposed inserts within an interconnect housing. In one embodiment, the alignment sleeve captured between the inserts is carried in between the inserts in a "loose" fit, with the spacing between the ferrule tips being controlled by the position of the distal ends of the inserts as opposed to the length of the alignment sleeve and the lengths of the inserts. Thus as a feature of the subject interconnect, the inserts can be spaced accurately and nonetheless provide a cavity into which an alignment sleeve may be carried. Note that the alignment sleeves captured in this manner have outside diameters which are both smaller than the diameter of the bore of the interconnect housing and larger than the bores of the inserts so that the sleeves do not fall out. This is accomplished through the use of relatively thick-walled alignment sleeves in the interconnection of ferrules having reduced diameter noses.

While in some instances the alignment sleeve can merely be dropped into the interconnect housing prior to assembly, if the alignment sleeve is small it may fall out during assembly and use. The problem is particularly acute for ferrules which have reduced diameter noses and which use thin-walled alignment sleeves. For such alignment sleeves their outside diameters are less than the diameter of the internal bore of each insert. Thus, the alignment sleeve can fall out.

Moreover, if the alignment sleeve is made from spring metal, the ends of which are flared, it is usually impossible to flare the ends enough to prevent the alignment sleeve from dropping out of the interconnect housing.

In order to prevent the falling out of an alignment sleeve, in one embodiment the alignment sleeve is placed within a carrier having dimensions which either prevent the carrier from falling out from between the inserts, or which is itself pressfit into the interconnect housing. In this embodiment the carrier is positioned approximately in the center of the housing, with the alignment sleeve either loosely or tightly contained therein. The inserts are then pressed in at either end of the housing. In this case, the seats formed by the inserts are spaced using the aforementioned tool, with the spacing of the distal ends of the inserts being determined not by the length of the inserts and the carrier, but rather by the positioning tool.

In the embodiments described in the preceding sections, the spacing of the distal ends of opposed inserts is not determined by the lengths of the inserts, but rather by the length of the positioning tool or other means, since the only surfaces which are maintained at a precise separation are the distal ends of the inserts. The spacing of the proximal ends of the inserts is relatively unimportant, which makes possible the use of loosely carried alignment sleeves. With the distal ends properly spaced, all that is required is that the ferrules have precise lengths from their tips to their flanges.

It is however possible to define the spacing of the distal ends of the inserts through the use of abutting precision length parts. Thus, two centrally-bored precision length inserts can be used to establish the aforementioned seats; or these seats can be established by a single precision length centrally-bored insert. Since it is possible to place an alignment sleeve in a rigid carrier having a precision ground length, a composite structure of a carrier sandwiched between two inserts can establish the distal ends of the inserts at a precise spacing.

In the last mentioned embodiments, precision spacing of the distal ends of the insert or inserts is provided by accurate sizing of the parts involved, as opposed to varying the positions of the distal ends of two opposing inserts.

BRIEF DESCRIPTION OF THE DRAWINGS

These and other features of the subject invention will be better understood in connection with the detailed description taken in conjunction with the following drawings of which.

DETAILED DESCRIPTION OF THE INVENTION

Non-Zero Ferrule Tip Spacing

As mentioned, it is important to provide for the spacing of the ends of opposed ferrules in an interconnect housing so that the ends of the fibers contained in the ferrules do not touch. This prevents the scoring or scraping of the ends of the optical fibers, which scoring or scraping dramatically reduces the efficiency of the light coupling between the fibers. Also as mentioned, the amount of light transmitted across the coupling falls off with the spacing distance between the opposed fibers. It is therefore of critical importance to provide a small, repeatable, but non-zero spacing between fibers carried by ferrules which are inserted in opposition into an interconnect housing.

Figure 1:
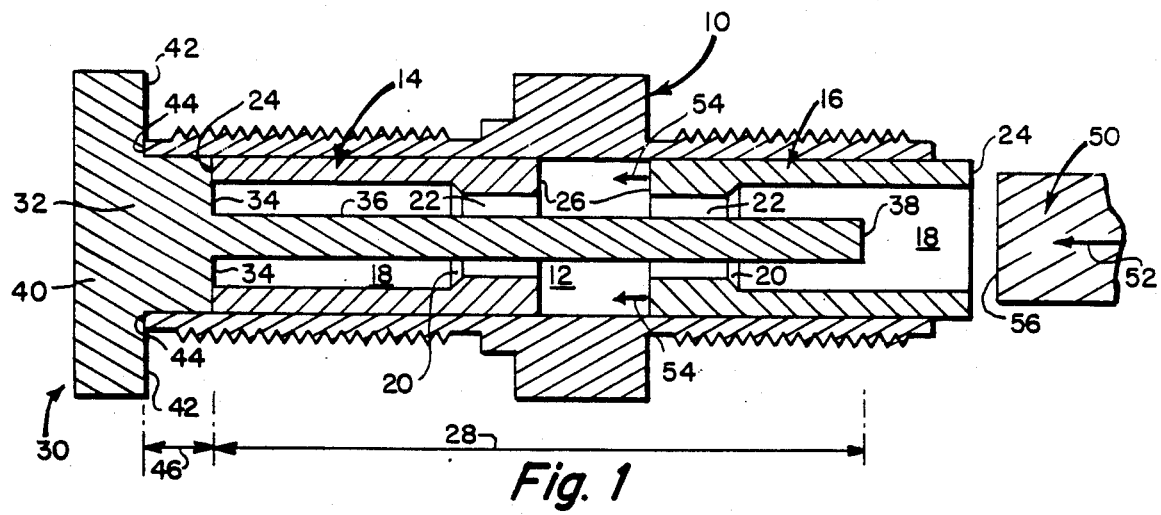
FIG. 1 is a cross-sectional illustration of an interconnect housing provided with opposed pressfit inserts showing the utilization of a positioning tool.

Referring now to FIG. 1, in one embodiment a housing 10 is provided with a central channel 12 into which is pressed an insert 14 from the left and an insert 16 from the right. Each of the inserts has a central bore 18 which is necked-down at 20 to provide a reduced diameter bore 22 which is symmetric about the central axis of the insert and thus the central axis of the housing. The necked-down bore will be seen to be important for the accommodation of a flanged alignment sleeve or for accommodating a reduced diameter ferrule nose.

Inserts 14 and 16 are pressfit to housing 10 and are retained within bore 12 because of the pressfit. Alternatively the exterior of each insert may be coated with adhesive prior to pressfitting, with the adhesive being LOCTITE 401 in one embodiment. The adhesive sets up after the positioning of the insert within the housing and further prevents movement of the inserts relative to the housing, which movement may be caused by the forcing of a ferrule into the corresponding insert.

It will be appreciated that each of the inserts has a distal end 24 and a proximal end 26. As mentioned, it is the spacing of the distal ends of the inserts which is important to provide recessed seats for the shoulders of opposed ferrules. Assuming that these seats must be a precise distance apart as indicated by double-ended arrow 28, a positioning tool generally indicated at 30 is utilized to position one insert relative to the other insert in order to establish this predetermined spacing. In one embodiment tool 30 includes a cylindrical central body 32 which has an end with a shoulder 34 from which a rod 36 projects into the central bore of the housing so as to extend along the central axis of the housing a distance indicated by double-ended arrow 28. Rod 36 is of a diameter slightly less than the bore of inserts 14 and 16. The tool provides that the distance between the end 38 of rod 36 and shoulder 34 is of a precise repeatable value. Tool 30 is also provided with an end cap 40 having a shoulder 42 which mates with an end 44 of housing 10 thereby to establish the position of insert 14 a predetermined distance indicated by double-ended arrow 46 from end 44. This distance is, however, non-critical.

In operation, insert 14 is inserted into channel 12 and is pressfit at the position illustrated by virtue of the communication of shoulder 34 with distal end 24 of this insert. If tool 30 is utilized to move insert 14 into the bore, its position can be established as indicated by double-ended arrow 46. After insert 14 has been properly positioned within housing 10, a flat-tipped tool 50, having a diameter slightly less than that of the outside of insert 16, is moved in the direction of arrow 52 so as to push insert 16 in the direction of arrows 54. The travel of insert 16 is limited by end 38 of tool 30 when this face mates with face 56 of plunger 50 so as to establish the coincidence of the distal end of insert 16 with the end of the positioning tool. Alternatively, the positioning of the inserts may be accomplished by a precision stop external to the interconnect housing which is referenced to end 24 of insert 14 by a rigid member outside the housing. This eliminates the necessity of providing an internal rod.

Figure 2A:
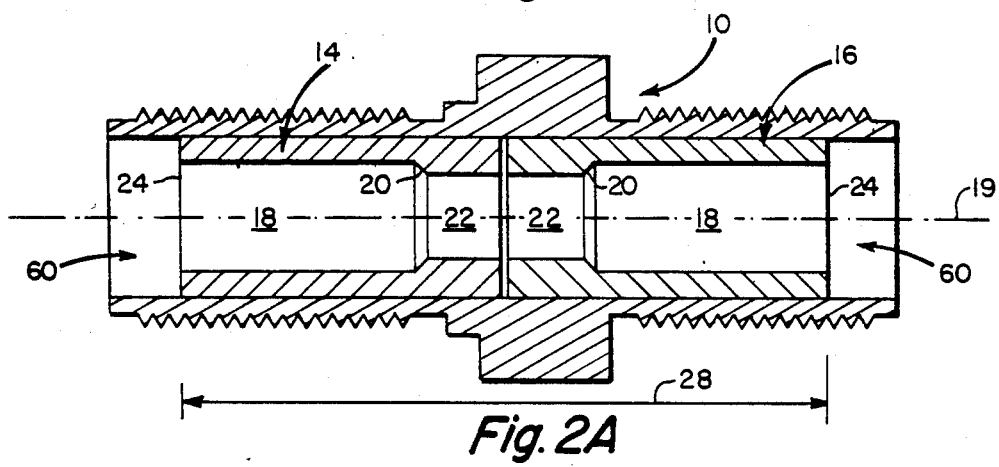
FIG. 2A is a cross-sectional illustration of a housing with properly positioned pressfit inserts.
Figure 2B:
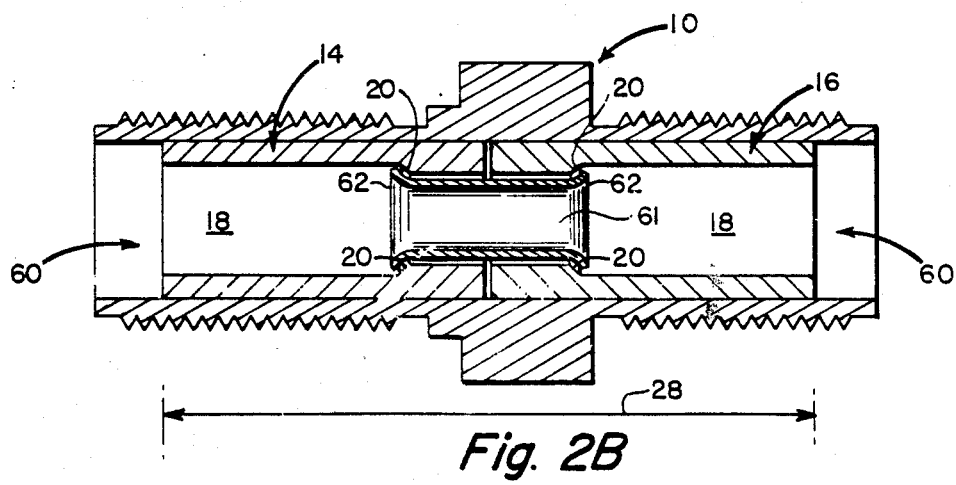
FIG. 2B is a cross-sectional illustration of the positioning of a flared-end alignment sleeve within the cavity defined by the inserts of FIG. 2A.
Figure 3:
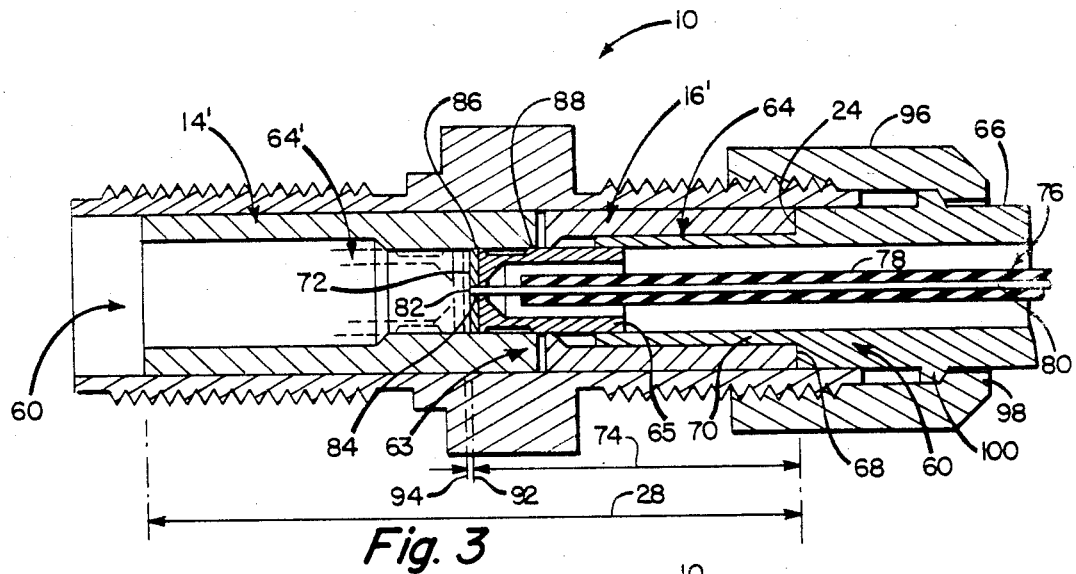
FIG. 3 is a cross-sectional illustration of an interconnect housing with pressfit inserts showing the insertion of a ferrule into an alignment sleeve formed by the bore in the proximal end of one of the inserts.

The result is illustrated in FIG. 2A in which distal ends 24 are precisely spaced as indicated by double-ended arrow 28 such that these ends form recessed seats generally indicated by reference character 60, with the neck-down reduced diameter bores 22 providing a structure to house the alignment sleeve illustrated in FIG. 2B. As illustrated in FIG. 3, the necked-down portion of one insert may itself be used as a clearance fit alignment sleeve.

Referring to FIG. 2B, a resilient spring metal alignment sleeve 61 of the type described in the aforementioned application, may be inserted into the cavity established by bores 22. If it is desirable to have a floating alignment sleeve, the diameter of the alignment sleeve is made less than that of bores 22 and the sleeve is flared at both ends as illustrated at 62, so that the sleeve is loosely retained in the aforementioned cavity. In this embodiment, the sleeve is prevented from falling out by virtue of the flared ends coacting with the tapered surfaces of the necked-down portions 20 of bores 18.

Referring now to FIG. 3, insert 14' has an elongated proximal end 63 to provide for elongated bore which itself serves as an alignment sleeve for ferrules 64 and 64' inserted in opposition in the elongated bore. Insert 16' is shown foreshortened to the extent that insert 14' is elongated. Ferrule 64' is shown only in dotted outline. Ferrule 64 is illustrated as comprised of a centrally channeled and apertured tubular ferrule nose 65 which is pressfit to a connector body 66 having an annular flange 68 as illustrated. Ferrule nose 65 is inserted into a reduced diameter connector body portion 70 such that a disk 72 at the end of the nose is maintained a predetermined distance from flange 68 as illustrated by arrow 74. A buffered fiber optic cable 76 having a buffer layer 78 and an optical fiber 80 is located along the central axis of ferrule 62 such that the end 82 of the optical fiber extends through a central aperture 84 in disk 72. The coaxial alignment is established by virtue of the outer dimension 86 of disk 72 as well as a removed shoulder portion 88 of ferrule nose 65.

With the mating of distal end 24 with shoulder 68, disk 72 of ferrule 64 is maintained at the position indicated by dotted line 92. Likewise, ferrule 64' is indicated as having its end residing at a position indicated by dotted line 94. The distance between the opposing ferrules may be as little as one ten-thousandth of an inch which is accurately controlled due to the accurate control of seats 60 as indicated by double-ended arrow 28.

In order to secure ferrule 64 to housing 10, a cap 96 is provided coaxially around connector body 66 with an end 98 cooperating with a flange 100 so as to urge connector body 66 inwardly when cap 96 is screwed onto connector body 10.

By virtue of the accuracy with which the aforementioned seats can be maintained and due to the accuracy of the tip-to-flange distance, it is possible to maintain a small but non-zero spacing between opposed ferrules inserted in opposition into the aforementioned inserts.

With respect to the composite ferrules shown in FIG. 3, as mentioned hereinbefore, it is possible to provide that the distance between disk 72 and flange 68 be exact due to the pressfitting of ferrule nose 65 into connector body 66. This can be accomplished with any type of positioning tool which keys off flange 68. Alternatively, the tip may be polished to length.

Alignment Sleeve Capture

Figure 4:
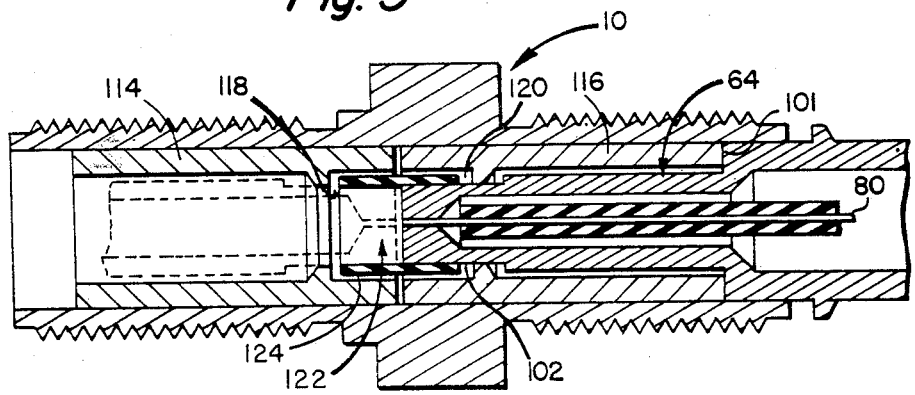
FIG. 4 is a cross-sectional illustration of an interconnect housing with inserts which have counterbored proximal ends for carrying a resilient alignment sleeve, a flanged ferrule being inserted through an insert and into the resilient alignment sleeve.

Referring to FIG. 4, ferrule 64 may be of a unitary construction having an integral flange 101 formed at the end thereof and an integral reduced diameter nose portion 102 corresponding to ferrule nose 65 of FIG. 3. It will be appreciated that like reference characters are provided for the embodiments of FIGS. 1, 2, 3 and 4.

In this embodiment however, the inserts here labeled 114 and 116 are provided with counterbores 118 and 120 which provide a chamber generally indicated at 122, capable of capturing therein a resilient alignment sleeve 124 such as described in U.S. Pat. No. 4,140,366. This is a relatively small, thin-walled resilient sleeve. The outer dimension of the ferrules in combination with the resilient alignment sleeve provide for the alignment of optical fibers concentric to each other. In the case of a resilient alignment sleeve, it may be inserted into cavity 118 either prior to or after positioning of insert 114. Thereafter, when insert 116 is forced into the other end of the connector body, it is captured between the inserts. In one embodiment the alignment sleeve is in a loose fit within counterbores 118 and 120. Alternatively, alignment sleeve 124 may be tightly carried in the counter bores.

Figure 5A:
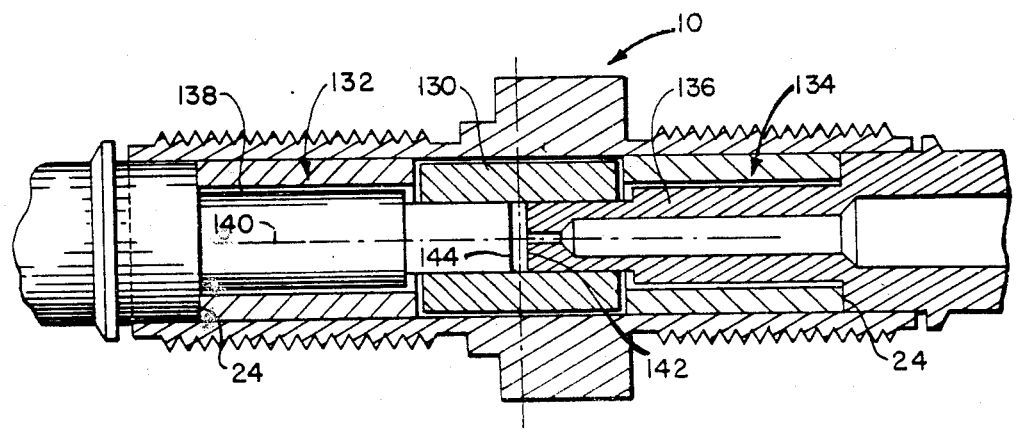
FIG. 5A is a cross-sectional and diagrammatic illustration of the utilization of tubular inserts and a rigid alignment sleeve captured between the inserts, also showing the use of a ferrule with a reduced diameter nose portion.

Referred now to FIG. 5A, a loosely fitting or floating rigid insert 130 may be provided between simple tubular inserts 132 and 134 within connector housing 10. The inserts are "simple" in that they are merely tubes or sleeves having their distal ends 24 precisely spaced-apart so as to provide recessed seats for inserted ferrules here diagrammatically illustrated at 136 and 138. It is the purpose of the loosely held alignment sleeve to be able to accommodate variation in the positions of ferrules 136 and 138 while nonetheless providing an axis 140 along which the fibers contained by these ferrules may be aligned. While the sleeve provides for alignment, it is important that the ferrule tips 142 and 144 do not touch and it is the seats provided by ends 24, along with the lengths of the ferrules from their respective flanges, which provides for a non-zero, yet small separation between the ferrule tips.

Figure 5B:
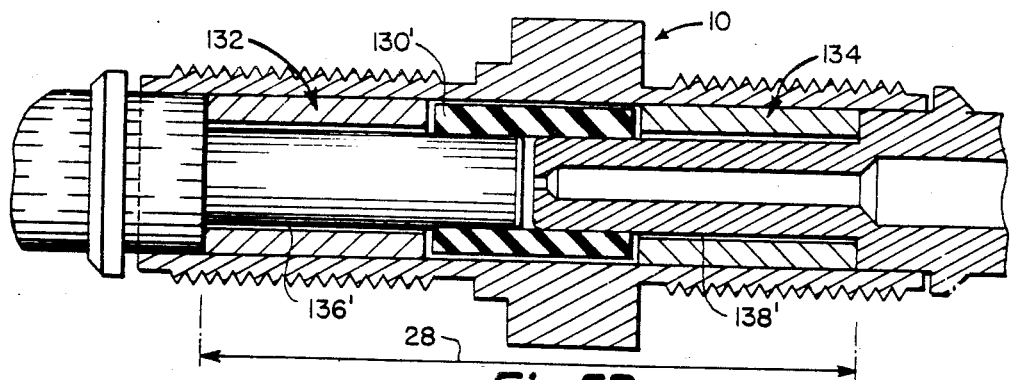
FIG. 5B is a cross-sectional and diagrammatic illustration of the utilization of tubular inserts and a resilient alignment sleeve captured between the inserts, also showing the use of a simple single diameter ferrule.

Referring to FIG. 5B, insert 130 of FIG. 5A is replaced with a resilient insert 130', also loosely carried between the inserts. The purpose of a resilient alignment sleeve in general is to accommodate slightly different diameter ferrules. Here the ferrules 136' and 138' are of a single diameter tubular construction and have an outside diameter slightly larger than the diameter of the bore of sleeve 130'.

In both the FIGS. 5A and 5B embodiments, the outside diameter of the alignment sleeve is both less than the diameter of the bore in the interconnect housing and greater than the diameter of the bores in the inserts. This permits the floating aspect of the sleeve while at the same time preventing the alignment sleeve from falling out of the housing. In both cases, the walls of the sleeve are relatively thick so as to permit capture of the sleeve without the use of a carrier.

Although the alignment sleeves of FIGS. 5A and 5B are shown to be floating, either sleeve may be tightly carried at the center of the interconnect housing.

Note that in all of the above-mentioned embodiments, it is the distal ends of the inserts which provide for the precision of the seats and therefore for the precision of the spacing of the ferrule tips. The proximal ends of the inserts are non-critical as to position, and indeed provide for the non-critical capture of an alignment sleeve therebetween.

Seat Spacing by Precision Part Length

As mentioned hereinbefore, it is possible to machine the inserts to be of a precise length such that if the inserts are inserted into a connector housing such that they touch, their distal ends will be a predetermined distance apart. Alternatively, only one insert need be used. Further, a spacing member such as an extended washer, spool, or carrier may be positioned between the inserts to provide for optimal spacing. In these embodiments the length of the insert and/or spacing member is indeed critical to the spacing of inserted ferrules. In all of the FIGS. 6, 7, and 8 embodiments, the spacing between the distal ends of the inserts is dependent upon the precision to which the individual parts can be formed as to their lengths.

Alignment Sleeve Carriers

As mentioned, especially with ferrules having reduced diameter nose portions, alignment sleeves are usually both thin-walled and small. In such a case, even if the alignment sleeves are inserted between two inserts, they can and usually do fall out.

Figure 6:
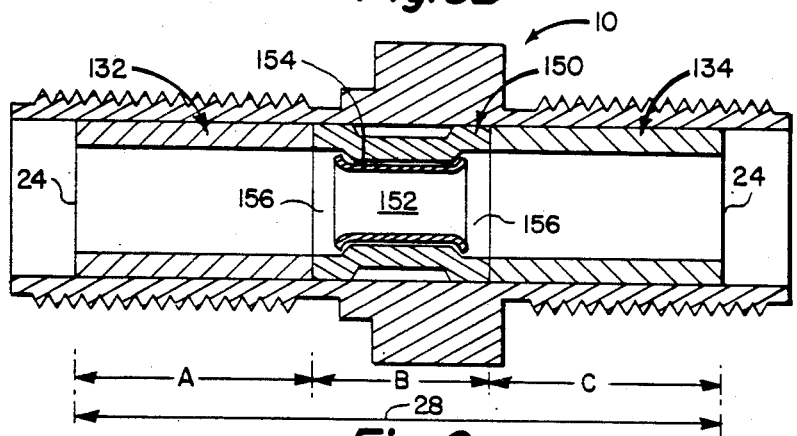
FIG. 6 is a cross-sectional illustration of a composite carrier-insert sandwich in which seat spacing is determined by precise length parts, also showing the capture of a flaired alignment sleeve within a spool-like carrier.

In FIG. 6, inserts 132 and 134 sandwich therebetween a rigid spool-like carrier 150 which captures a loosely held flared alignment sleeve 152 in a necked-down channel portion 154 which has a reduced diameter vis-a-vis channel 156. Alignment sleeve 152 is captured in carrier 150 in the same manner as illustrated in FIG. 2B. In this embodiment the alignment sleeve is loosely carried within the carrier, although in alternative embodiments this need not be the case. In fact spool 150, having a reduced diameter channel 154, may itself serve as an alignment sleeve.

In addition to providing a carrier for an alignment sleeve, carrier 150 serves as a precision spacing member between precisely ground inserts 132 and 134. The spacing of the distal ends 24 of the inserts is accomplished by the precision lengths of the parts involved, such that the distance indicated by double-ended arrow 28 is made up of individual lengths A, B, and C. As can be seen in this embodiment, the alignment sleeve is carried totally within the carrier and is therefore protected.

Figure 7:
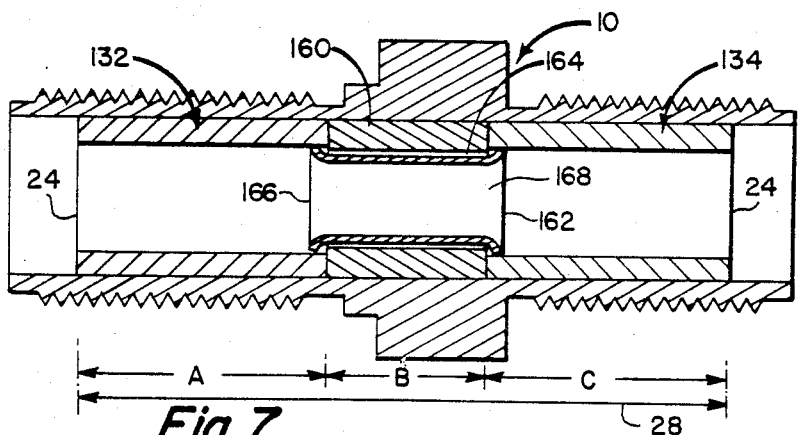
FIG. 7 is a cross-sectional illustration of a composite carrier-insert sandwich in which seat spacing is determined by precise length parts, and in which the carrier is a simple tube; and, FIG. 8 is a cross-sectional illustration of an interconnect housing having a single precise length insert which defines the seat spacing.

A simpler version of a composite structure is illustrated in FIG. 7, in which a tubular carrier 160 is sandwiched between inserts 132 and 134. In this case, an elongated alignment sleeve 168 is positioned within a channel 164 of carrier 160 and is flared at 166 and 162 so that the alignment sleeve is retained within interconnect body 10. Again, distal ends 24 are maintained at a predetermined spacing by virtue of the individual lengths of the inserts and the carrier. As in FIG. 6, the interior wall of the carrier may serve itself as an alignment sleeve. In either the FIG. 6 or FIG. 7 embodiments, it is convenient to mount the alignment sleeve in the carrier prior to the assembly of the composite structure.

In either the FIG. 6 or FIG. 7 embodiments, it will be appreciated that not only are the distal ends of the inserts spaced-apart by virtue of the precise lengths of the parts involved, because a carrier is utilized, the sometimes fragile and often small alignment sleeves do not fall out of the interconnect either during assembly or during use.

Figure 8:
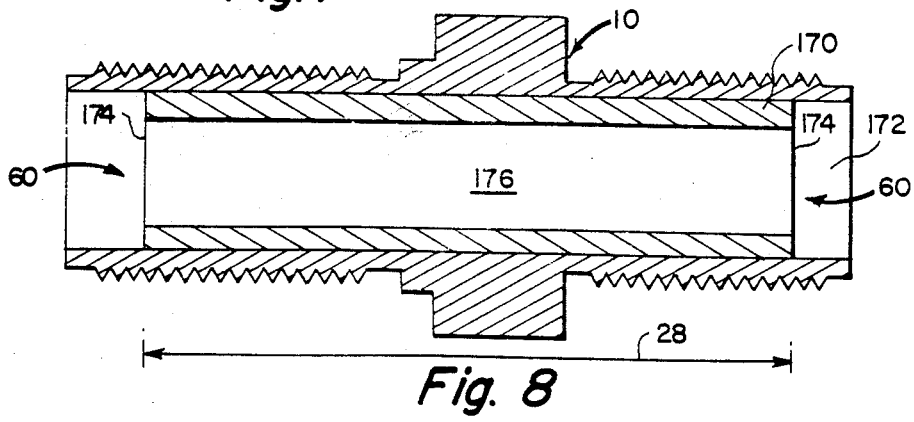

Finally, with respect to FIG. 8, interconnect housing 10 may be provided with a single tubular insert 170 which is ground to a precise length as indicated by arrow 28. With this single insert pressfit into the interior channel 172 of the interconnect housing, recessed seats 60 are formed at the distal ends 174 of the single insert. Central channel 176 of the insert may be utilized as an alignment surface for opposed inserted ferrules, making the FIG. 8 embodiment one of the most simple interconnect housings available which establishes precision spaced-apart seats to prevent the tips of two inserted ferrules from touching.

What has therefore been provided is an interconnect for ferrule optical fibers which assures that the ferrule tips will not touch when inserted into an interconnect housing. The interconnect housing provides for a small, repeatable, yet non-zero spacing between the ends of opposed ferrules through a manufacturing technique in which the interconnect housing is provided with inserts pressfit into the housing utilizing a tool that establishes a precise spacing for the distal ends of the inserts regardless of the lengths of the inserts, thereby to provide precisely spaced-apart recessed seats for the flanges of the ferrules. The use of inserts also permits the formation of a central cavity in which an alignment sleeve may be either loosely or tightly captured. In one embodiment, a carrier is provided for the alignment sleeve to prevent the falling out of the alignment sleeve during manufacture or use. In other embodiments in which recessed seat spacing is provided by a precise length part or parts, a single precise length insert may be used in place of the two inserts, with the distal ends of the insert forming the spaced-apart recessed seats. Alternatively, precise length inserts may be used with a precise length spacing member sandwiched therebetween, in which the spacing member may be the aforementioned alignment sleeve carrier.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for maintaining ferruled fibers in spaced-apart axial alignment comprising:
   an interconnect housing having a bore; and,
   a pair of inserts pressfit into said bore in spaced-apart opposition, the distal ends of said inserts being a predetermined distance apart and each having a channel adapted to receive a fiber-retaining ferrule with a flange at the distal end thereof, the sum of the lengths of the ferrules from tip-to-flange being less than said predetermined distance, whereby when opposed inserted ferrules seat at the distal ends of respective inserts, the ends of said fibers are maintained at a predetermined non-zero spacing.

2. The system of claim 1 wherein the proximal ends of said pressfit inserts define a cavity within said housing, and further including an alignment sleeve captured between said inserts in said cavity.

3. The system of claim 2 wherein said proximal ends are counterbored.

4. The system of claim 2 wherein said inserts are tubular.

5. The system of claim 2 wherein said cavity is of a size to provide a loose fit for the alignment sleeve therein.

6. The system of claim 2 wherein said cavity is of a size to provide a tightfit for the alignment sleeve.

7. The system of claim 2 wherein said alignment sleeve is rigid.

8. The system of claim 2 wherein said alignment sleeve is resilient.

9. The system of claim 1 and further including in combination therewith a fiber-retaining ferrule having a flange at one end.

10. The system of claim 9 wherein said ferrule has a pressfit nose portion pushed in so that the tip-to-flange distance may be easily preset.

11. The system of claim 1 wherein at least one of said inserts has a necked-down bore at the proximal end thereof adapted to serve as part of an alignment sleeve.

12. The system of claim 1 wherein both of said inserts have a necked-down bore at the proximal ends thereof.

13. The system of claim 1 and further including adhesive between the exterior surface of an insert and the interior wall of the housing bore into which said insert is pressfit.

14. The system of claim 1 and further including a tool for establishing the predetermined distance that said distal ends of said inserts are spaced-apart, said tool including:
   an end portion adapted to seat at the distal end of one insert;
   a portion projecting said predetermined distance from said end portion and adapted to reside in said housing bore when said one insert is inserted at one end of said housing bore and said end portion is seated against the distal end of said one insert; and
   means including a member having a face adapted to coact with the distal end of the other of said inserts for moving said other insert in said housing bore towards said one insert until the face of said member contacts the end of said projecting portion.

15. A system for maintaining ferruled optical fibers in spaced-apart axial alignment comprising:
   an interconnect housing having a bore; and,
   bored parts having predetermined lengths pressfit into said housing bore such that adjacent parts are contiguous, at least two of said parts defining inserts having distal ends defining seats within said housing which are precisely spaced-apart.

16. The system of claim 15 wherein one of said parts is a carrier for an alignment sleeve.

17. The system of claim 16 wherein said carrier is spool-shaped and has a bore therethrough.

18. The system of claim 17 and further including an end-flared alignment sleeve mounted in the bore in said spool.

19. The system of claim 16 wherein said carrier is cylindrical and has a bore therethrough.

20. The system of claim 19 and further including an end-flared alignment sleeve having all but its flared ends within the bore in said cylindrical carrier.

21. An optical fiber connector system for mounting an alignment sleeve within an interconnect housing having a bore therethrough comprising:
   an alignment sleeve in said housing bore; and,
   pressfit bored inserts in said housing bore to either side of said alignment sleeve, said inserts capturing said sleeve in said housing.

22. The system of claim 21 wherein said inserts are tubular.

23. The system of claim 21 wherein said inserts are cylindrical and centrally bored and wherein the proximal ends of each of said inserts is counterbored for capturing a portion of the alignment sleeve therein.

24. A method of establishing a small, yet non-zero spacing between ferruled optical fibers inserted in opposition into a housing having a bore in which the ferrules are provided with a flange and a predetermined tip-to-flange spacing comprising the steps of:
   pressfitting opposed bore inserts into the housing bore such that the distal ends of the inserts are spaced-apart by a predetermined distance greater than the sum of the tip-to-flange spacings of the ferrules, the distal ends of the inserts forming seats for respective ferrule flanges; and,
   inserting the flanged ferrules into the bores of different inserts such that the tips of the ferrules are in spaced-apart axial opposition.

25. The method of claim 24 wherein said pressfitting step includes the steps of:
   pressfitting one insert to one end of the housing;
   inserting a tool into said housing from said one end, said tool having an end seated against the distal end of said one insert and having a member projecting from said one end into the housing bore said predetermined distance; and,
   pressfitting the other insert into the housing bore from the other end of said housing until the distal end of the other insert is coincident with the end of the projecting member of the tool.

* * * * *

UNITED STATES PATENT AND TRADEMARK OFFICE
CERTIFICATE OF CORRECTION

PATENT NO. : 4,444,461
DATED : April 24, 1984
INVENTOR(S) : Robert A. Wey; Harold A. Roberts; Roger Dery It is certified that error appears in the above—identified patent and that said Letters Patent is hereby corrected as shown below:

Column 7, line 46, "Referred now to Fig. 5A," should read
--Referring now to Fig. 5A,--

Column 9, line 30, "ferrule optical" should read
--ferruled optical--

Column 12, line 3, "pressfitting opposed bore" should read
--pressfitting opposed bored--

Signed and Sealed this

Fourth Day of November, 1986

[SEAL]

*Attest:*

DONALD J. QUIGG

*Attesting Officer*  *Commissioner of Patents and Trademarks*